May 6, 1969         J. G. BUTLER ETAL         3,442,069

SAFETY INTERLOCK MECHANISM FOR COMBINE HARVESTER

Original Filed Dec. 29, 1965

INVENTORS.
JAMES G. BUTLER &
ROBERT ASHTON
BY
Tweedale & Gerhardt
ATTORNEYS.

INVENTORS.
JAMES G. BUTLER &
ROBERT ASHTON

United States Patent Office 3,442,069
Patented May 6, 1969

3,442,069
SAFETY INTERLOCK MECHANISM FOR COMBINE HARVESTER

James G. Butler and Robert Ashton, Islington, Ontario, Canada, assignors to Massey-Ferguson Industries Limited, Toronto, Ontario, Canada
Continuation of application Ser. No. 517,327, Dec. 29, 1965. This application July 5, 1968, Ser. No. 746,696
Int. Cl. A01d 41/04, 41/02
U.S. Cl. 56—20         9 Claims

ABSTRACT OF THE DISCLOSURE

A safety interlock for combine harvester headers includes a locking member joining a header and an elevator. The locking member is controlled and blocked by a safety interlock which includes a bar with a curved upper end lockingly engaged with the mating shaft ends of the power take-off driveshaft. Only upon release of this bar and the disconnection of the ends of the drive shafts can the header be separated from the elevator of the combine.

---

This application is a continuation of application Ser. No. 517,327, filed Dec. 29, 1965 and now abandoned.

This invention relates to combine harvesters with detachable, power-driven headers and more particularly to a safety mechanism for preventing physical disconnection of the header until the driving means have been disengaged.

Combine harvesters have recently been developed wherein thet header can be detached from the elevator section of the combine harvester for transport, and wherein different headers for harvesting various crops can be mounted on the elevator section of the combine harvester. It has been observed that the detachment of the header from the elevator portion of a combine harvester poses a special problem with respect to the power transmitting means which allow operative interconnection between the elevator section and the header section. If the header is detached without first disengaging the power transmitting means, it is easily possible that the still coupled power transmitting means are severely damaged upon removal of the header.

Accordingly the invention consists in a safety interlock mechanism which is in engagement with an enlarged member such as a sleeve interconnecting the elevator portion with the header portion of the power transmitting means. Only after shifting of said enlarged member or sleeve into a position in which the elevator and header portions are disengaged from each other, can the mechanism be actuated and the header be uncoupled from the elevator section of the combine harvester.

In order that the invention may be more clearly understood a preferred embodiment will now be described with reference to the accompanying drawings in which.

Figure 1:
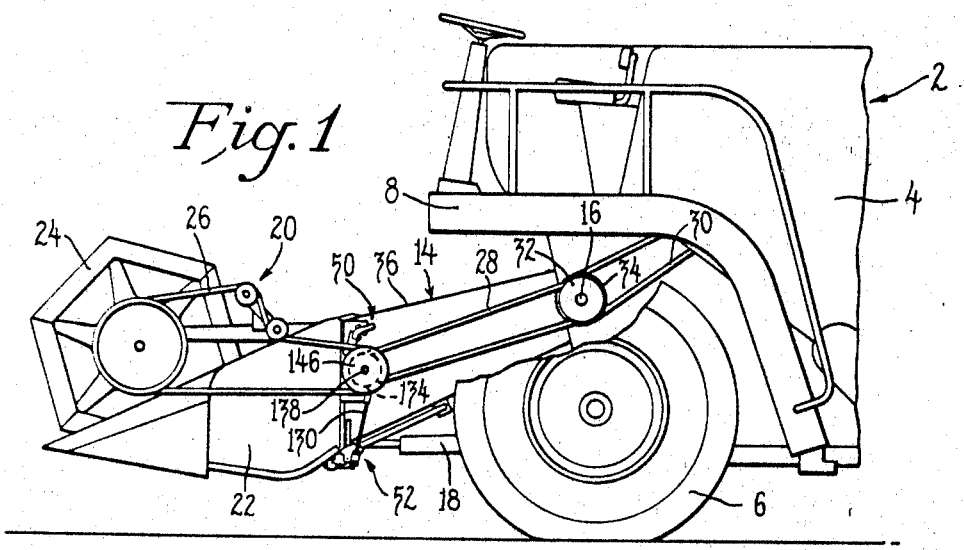
FIG. 1 is a partial elevational view of a combine harvester embodying the invention.

With reference to FIG. 1, a self-propelled combine harvester is designated generally by reference numeral 2 and includes a main body 4, front wheels 6 and an operator's platform 8. The main body 4 encloses the threshing and other crop treating mechanism of the combine.

Mounted on the forward end of the combine harvester 2 for pivotal movement about the axis of a shaft 16 is a conventional elevator housing 14. The elevator housing 14 is raised and lower about the axis of the shaft 16 by hydraulic rams 18 in a conventionl manner.

Supported on the forward end of the elevator housing 14 is a crop gathering header 20 including a harvesting table 22 on which is mounted a conventional grain reel 24. The operating parts of the harvesting table 22 are driven through a header belt drive 26 from belts 28 and 30, each having one end supported on drive wheels 32 and 34, respectively. The belt 26 leads over a drive wheel 146 which is mounted on a header axle portion 138 and is adapted for operative engagement with the combine haverster power drive 28, 30, 32, 34 via an elevator axle portion 148 which is driven by the belt 28 over a drive wheel 134 which is carried on the elevator axle portion 148.

Figure 2:
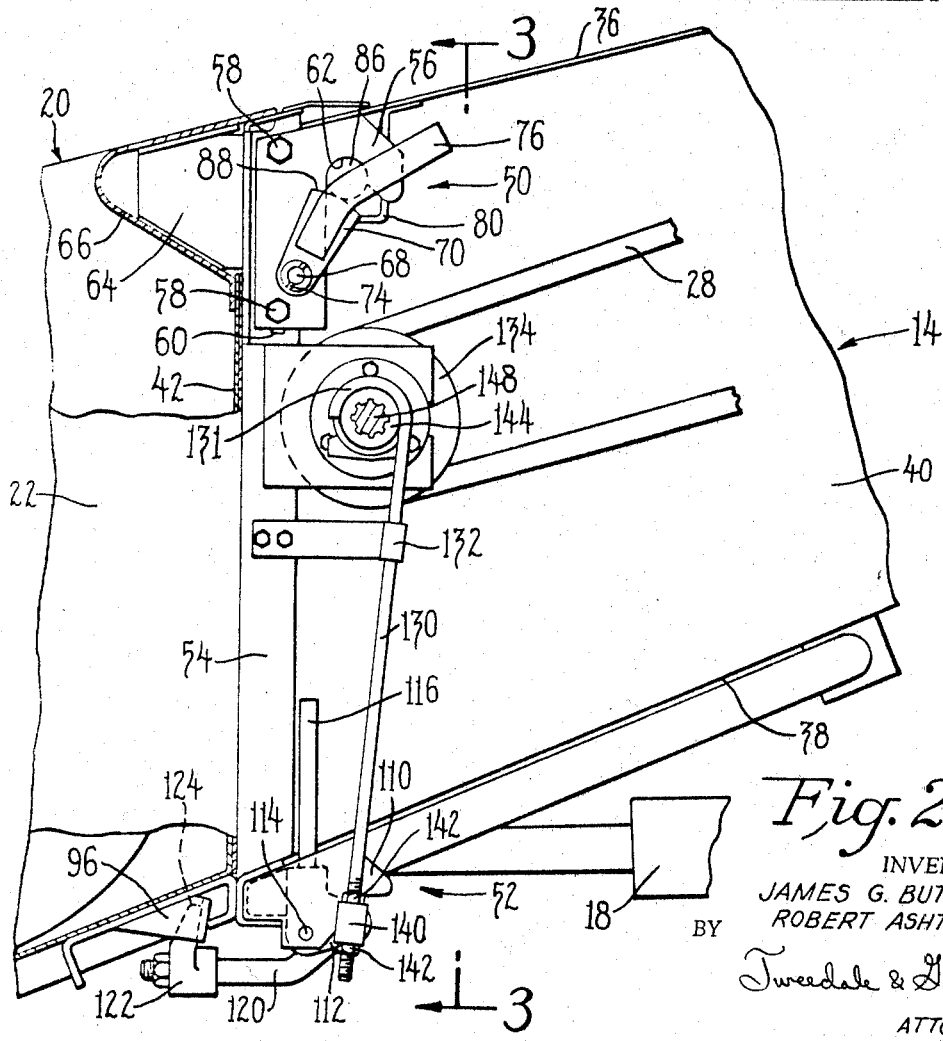
FIG. 2 is an enlarged view of the mating portions of the header and elevator sections of the combine harvester of FIG. 1 including the invention in greater detail.
Figure 3:
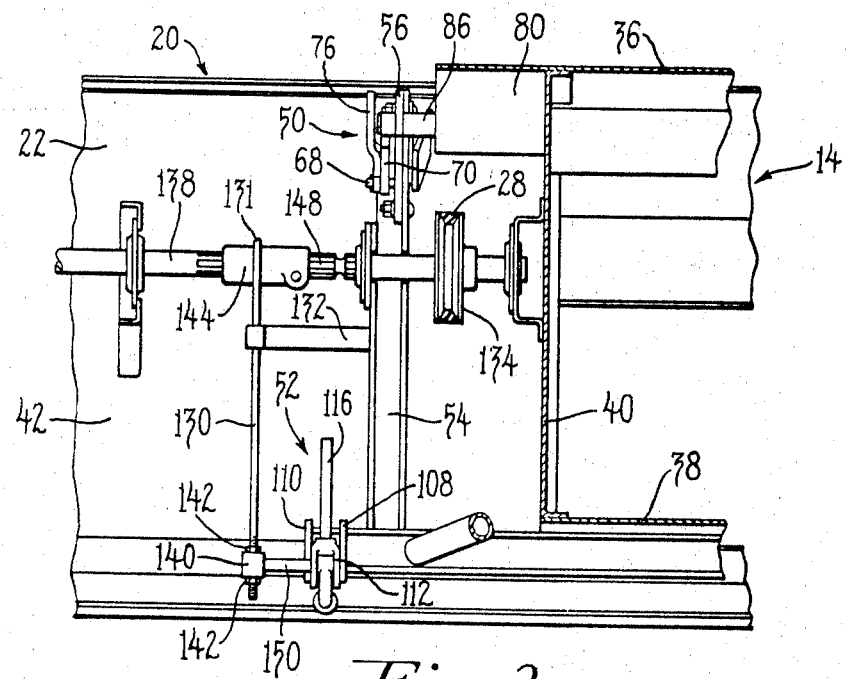
FIG. 3 is a partial sectional view taken on line 3—3 of FIG. 2.

As shown in FIGS. 2 and 3, the elevator housing 14 includes a top wall 36, a bottom wall 38 and side walls 40 which encloses the usual crop elevator or conveyor.

The header 20 is detachably secured to the forward end of the elevator section 14 by upper and lower couplings 50 and 52, respectively.

Coupling support members 54 extend between the upper and lower edges of the rear wall 42 of the header 20 with out disturbing the lower couplings 52. The upper coupling 50 includes a pair of engageable and disengageable coupling elements, one of which is mounted on the header 20 and the other of which is mounted on the elevator housing 14. The coupling 50 which is illustrated in FIG. 2 comprises a hook 56 which is secured to the upper end of the member 54 by bolts 58 received in slots 60 in the member 54 allowing vertical adjustment of the hook 56 on the member 54. The hook 56 is formed with a downwardly opening groove 62. Extending transversely along the upper edge of the rear wall 42 is a curved, rearwardly opening sheet metal beam member 66 in which is mounted a bearing plate 64. The bearing plate 64 projects rearwardly from the table 22 and rests against the coupling support member 54 on the opposite side of the hook 56.

Mounted on the hook 56 and projecting laterally therefrom is a pin 68 for rotatably supporting a locking member 70. Mounted transversely in the end of the pin 68 is a stop pin 74 which axially retains the locking member 70 on the pin 68. Secured to the locking member 70 is an operating handle 76 for rotating the locking member 70 on the pin 68.

Projecting laterally from each side of the upper forward edge of the elevator housing 14 is a bearing housing 80 with bearing plates mounted therein for supporting a coupling pin 86. The coupling pin 86 is received in the groove 62 of the coupling hook 56 and is secured therein by the locking member 70. The upper curved edge 88 of the locking member 70 engages the coupling pin 86 upon clockwise movement of the operating handle 76 to prevent accidental disengagement of the coupling pin 86 from the hook 56.

The details and operation of the coupling elements 50 and 52 are disclosed in the copending U.S. patent application Ser. No. 457,009, filed May 19, 1965, the entire disclosure of which is incorporated herein by reference.

The lower coupling 52 includes a U-shaped locking member 96 on the header 20 and a lever 120 having a lug 122 at its outer end. The lever 120 is mounted on the elevator housing 14. The lug 122 has a nose 124. Upon engagement between the locking member 96 and the nose 124 the header is attached to the elevator portion 14 of the combine harvester 2. Between a pair of parallel support plates 108 and 110 (FIG. 3), a bell crank 112 is pivoted at pivot 114. The bell crank 112 is connected at one side with an operating handle 116 and at the other side with the lever 120. Rocking of the operating handle 116 disengages the nose 124 from the locking member 96.

The safety interlock mechanism according to the invention, is comprised of an upwardly extending bar 130 with a curved upper end 131, a bracket 132 which slidably holds the bar 130 to allow vertical movement thereof and a holding arm 150 which is mounted on the bell crank 112 and holds the upwardly extending bar 130 in a threaded member 140 wherein the bar 130 is secured in its adjusted position by nuts 142. The bracket 132 is mounted on the elevator housing 14.

As it is the object of the safety interlock mechanism to prevent detachment of the header 20 from the elevator portion 14 of the combine harvester 2 before the drive shaft connection 138, 148 has been disconnected, the operating lever 116 of the lower coupling 52 for disengaging the lever 120 with lug 122 and nose 124 from the locking member 96 at the header 20 (FIG. 2) cannot be operated before the bar 130 has been freed to move downwardly.

Figure 4:
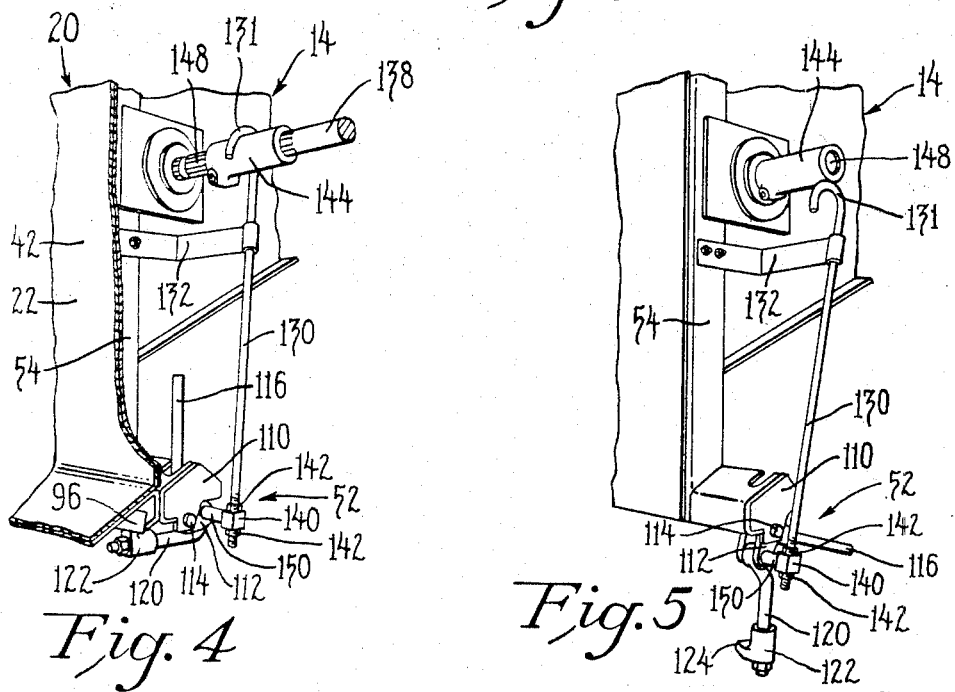
FIGS. 4 and 5 are perspective views, with parts broken away for greater clarity, illustrating the safety interlock mechanism according to the invention in its engaged and disengaged positions, respectively.
Figure 5:
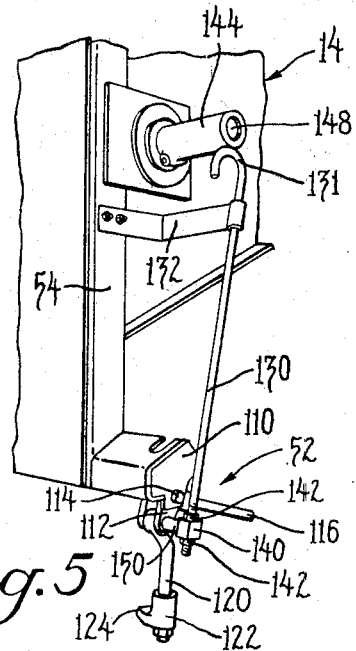

FIG. 4 shows how the curved upper end 131 of the bar 130 engages an internally splined sleeve 144 which interconnects the splined shaft ends 138 and 148. After the sleeve 144 on the shaft ends has been moved laterally, the sleeve 144 frees one of the shaft ends and at the same time removes the resistance of the sleeve from the curved upper end 131 of the bar 130. This in turn frees the bar 130 and allows actuation of the lever 120. The lever 116 can now be moved clockwise because the lower coupling 52 is not held in locked position any more by the bar 130, with the result of disengaging the nose 124 from the locking member 96. After the lower coupling 52 has been disengaged, the header 20 can be removed by subsequent disengagement of the upper coupling 50.

Thanks to the invention the detachment of the header section is only possible after the shaft connection between the header and the elevator sections of the combine harvester has been disengaged, thereby safeguarding the assembly in a foolproof manner against any damage to the power transmitting means such as mating shaft ends.

We claim:

1. In a combine having an attachment, cooperable coupling means on the combine and on the attachment for coupling the attachment to the combine and including latch means movable between latched and unlatched positions, power transmission means mounted on the combine and on the attachment, and connecting means movable between connected and unconnected positions for operatively interconnecting the power transmission means, the improvement comprising: cooperable blocking means on the latch means and on the connecting means for blocking movement of the latch means from latched to unlatched positions when the connecting means are in the connected position, and permitting such movement of the latch means when the connecting means are in the unconnected position, thereby preventing uncoupling of the attachment from the combine while the power transmission means are operatively interconnected.

2. The combine of claim 1, wherein: the power transmission means include a transmission member mounted on each of the combine and the attachment, the members being spaced when the attachment is coupled to the combine; the connecting means include a coupling member extending between and operatively interconnecting the transmission members in connected position; and the blocking means include a blocking member operatively associated with the latch means for movement thereby between the transmission members upon movement of the latch means from latched to unlatched positions, the blocking means further including a blocking surface on the coupling member and operable in the connected position to block movement of the blocking member between the transmission members.

3. The combine of claim 1, wherein: the power transmission means include a rotary shaft mounted on each of the combine and the attachment, the shafts being spaced and substantially coaxially aligned when the attachment is coupled to the combine; the connecting means include a sleeve extending between the shafts in connected position; and the blocking means include a blocking member mounted on the latch means and movable between the shafts upon movement of the latch means from latched to unlatched positions, and a surface formed on the sleeve for blocking movement of the blocking member between the shafts when the sleeve is in connected position.

4. In a combine having a main body with a vertically movable elevator section and a header section supported by the elevator section, said elevator and header sections having mating surfaces, upper and lower coupling means for detachably connecting the header section with the elevator section, mating power transmitting means in the elevator and header sections, and a movable member for operatively inter-connecting said mating power transmitting means; a safety interlock mechanism comprising an upwardly extending bar in locking contact with and being held in position by said member upon connection of the mating power transmitting means, a bell crank pivoted on the elevator section, said upwardly extending bar having its lower end mounted on said bell crank, and said bell crank being linked for detachable engagement with the header section of the coupling means, wherein uncoupling is only possible upon previous shifting of said member whereby said bar is freed to allow disengagement by rocking said bell crank being detachably linked with the header section of the coupling means.

5. In a combine having a main body with a vertically movable elevator section and a header section supported by the elevator section, said elevator and header sections having mating surfaces, upper and lower coupling means for detachably connecting the header section with the elevator section, said lower coupling means comprising a locking member on the header section, a bell crank pivoted on the elevator section, a lever pivotally carried on said bell crank for detachably engaging the locking member on the header section, and an operating handle pivotally connected with said bell crank, and mating shaft means in the elevator and header sections with a movable sleeve for operatively interconnecting said mating shaft ends; a safety mechanism comprising an upwardly extending bar being held in position by said sleeve upon connection of the mating shaft ends, said upwardly extending bar being mounted on said bell crank at its lower end, disengagement of the lower coupling means being only possible upon previous lateral sliding of said sleeve, whereby said bar is freed to allow uncoupling by rocking said bell crank by means of actuating said operating handle.

6. The safety mechanism as claimed in claim 5, further comprising a bracket on the elevator section, said bracket holding said upwardly extending bar in guided vertical sliding movement.

7. The safety mechanism as claimed in claim 5, wherein said upwardly extending bar has a lower threaded end and is mounted on said bell crank in a holding arm extending therefrom and ending in a threaded member, said threaded portion of the bar being adjustably held in said threaded member.

8. The safety mechanism as claimed in claim 5, wherein said upwardly extending bar has a curved upper end for engagement with said sleeve operatively connecting the shaft ends.

9. The safety mechanism as claimed in claim 5, wherein said sleeve is internally splined and said shaft ends are externally splined for non-rotary interconnection.

References Cited

UNITED STATES PATENTS

| | | | |
|---|---|---|---|
| 2,376,539 | 5/1945 | Hitchcock et al. | 56—20 |
| 2,452,153 | 10/1948 | Ronning et al. | 56—208 |
| 2,575,466 | 11/1951 | Paul | 180—14 |
| 2,618,350 | 11/1952 | Von Ruden | 180—53 |
| 3,035,384 | 5/1962 | Mitchell | 56—15 |

ALDRICH F. MEDBERY, *Primary Examiner.*

U.S. Cl. X.R.

56—2, 23; 180—53